(12) United States Patent
Paul

(10) Patent No.: US 10,253,833 B2
(45) Date of Patent: Apr. 9, 2019

(54) HIGH PERFORMANCE DISC BRAKE ROTOR

(71) Applicant: Honda Motor Co., Ltd., Tokyo (JP)

(72) Inventor: Scott Paul, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/638,439

(22) Filed: Jun. 30, 2017

(65) Prior Publication Data

US 2019/0003540 A1    Jan. 3, 2019

(51) Int. Cl.
*F16D 65/12* (2006.01)
*F16D 65/02* (2006.01)

(52) U.S. Cl.
CPC ......... *F16D 65/128* (2013.01); *F16D 65/127* (2013.01); *F16D 2065/132* (2013.01); *F16D 2065/1304* (2013.01)

(58) Field of Classification Search
CPC .... F16D 65/121; F16D 65/123; F16D 65/127; F16D 2065/132; F16D 2065/1328; F16D 2065/1332; F16D 2065/134; F16D 2065/1356
See application file for complete search history.

(56) References Cited

U.S. PATENT DOCUMENTS 2,708,492 A * 5/1955 Helsten ............... F16D 65/121
                                        188/218 XL
3,391,763 A * 7/1968 Severson ............. F16D 65/125
                                        188/218 XL
3,732,953 A * 5/1973 Huet .................. F16D 65/125
                                        188/218 XL
4,108,286 A   8/1978 Gagarin
(Continued)

FOREIGN PATENT DOCUMENTS

DE        2822379 A1 * 11/1979 ........... F16D 65/123
DE        19807184       4/2000
WO        2000032330     6/2000

OTHER PUBLICATIONS

Machine translation of DE-2822379 (no date).*
(Continued)

*Primary Examiner* — Nicholas J Lane
(74) *Attorney, Agent, or Firm* — Rankin, Hill & Clark LLP

(57) ABSTRACT

A disc brake rotor includes a core including a hat-shaped section, an annular inboard mounting surface, and an annular outboard mounting surface axially spaced from the inboard mounting surface and connected to the inboard mounting surface. The hat-shaped section has a central mounting face and a cylindrical shoulder extending from a periphery of the mounting face. The outboard mounting surface has an interior peripheral edge radially spaced from the shoulder, and the inboard mounting surface has an interior peripheral edge engaged to the shoulder. An inboard friction ring includes radially extending first projections secured to the inboard mounting surface. The outboard friction ring includes radially extending second projections secured to the outboard mounting surface. The first projections are angularly aligned with the second projections. The first and second projections extend into the space between the inboard and outboard mounting surfaces and have a gap therebetween.

20 Claims, 5 Drawing Sheets

(56) References Cited

U.S. PATENT DOCUMENTS

| | | |
|---|---|---|
| 5,183,632 A * | 2/1993 | Kiuchi ............ B22F 7/06 419/10 |
| 5,503,214 A | 4/1996 | Cribley et al. |
| 5,509,510 A * | 4/1996 | Ihm .............. F16D 65/125 164/112 |
| 5,620,042 A * | 4/1997 | Ihm .............. F16D 65/125 164/111 |
| 5,620,791 A | 4/1997 | Dwivedi et al. |
| 5,712,029 A | 1/1998 | Tsugawa et al. |
| 5,765,667 A | 6/1998 | Ross et al. |
| 5,878,849 A | 3/1999 | Prunier, Jr. |
| 5,957,251 A | 9/1999 | Jones et al. |
| 6,032,769 A * | 3/2000 | Daudi ............ F16D 65/0006 188/218 R |
| 6,112,398 A | 9/2000 | Messina |
| 6,139,215 A | 10/2000 | Kühne et al. |
| 6,180,258 B1 | 1/2001 | Klier |
| 6,214,472 B1 | 4/2001 | Barton et al. |
| 6,265,071 B1 | 7/2001 | Gross et al. |
| 6,273,222 B1 | 8/2001 | Rebstock et al. |
| 6,280,496 B1 | 8/2001 | Kawai et al. |
| 6,296,045 B1 | 10/2001 | Fox et al. |
| 6,302,246 B1 | 10/2001 | Naumann et al. |
| 6,427,755 B1 | 8/2002 | Buckley |
| 6,446,765 B1 | 9/2002 | Dabertrand et al. |
| 6,450,303 B1 | 9/2002 | Keck et al. |
| 6,458,466 B1 | 10/2002 | Jones |
| 6,467,588 B1 | 10/2002 | Baumgartner et al. |
| 6,536,564 B1 | 3/2003 | Garfinkel et al. |
| 6,564,856 B1 | 5/2003 | Buckley |
| 6,598,716 B1 | 7/2003 | Ihm |
| 6,626,273 B1 | 9/2003 | Baumgartner et al. |
| 6,630,247 B1 | 10/2003 | Fox |
| 6,722,479 B2 | 4/2004 | Baumgartner et al. |
| 6,739,437 B2 | 5/2004 | Garfinkel et al. |
| 6,910,556 B1 | 6/2005 | Baumgartner et al. |
| 6,919,127 B2 | 7/2005 | Waggoner et al. |
| 6,945,309 B2 | 9/2005 | Frait et al. |
| 7,028,816 B2 | 4/2006 | Baumgartner et al. |
| 7,096,920 B2 | 8/2006 | Debus et al. |
| 7,267,882 B2 | 9/2007 | Breslin et al. |
| 7,410,036 B2 | 8/2008 | Wimmer et al. |
| 7,578,336 B2 | 8/2009 | Stahl, Jr. et al. |
| 7,648,932 B2 | 1/2010 | Weisensel et al. |
| 7,753,103 B1 | 7/2010 | Rochester |
| 7,762,379 B2 | 7/2010 | Fujita et al. |
| 7,938,378 B2 | 5/2011 | Hanna et al. |
| 8,006,740 B2 * | 8/2011 | Strom ............ B22D 19/04 164/100 |
| 8,037,980 B2 | 10/2011 | Pahle |
| 8,101,283 B2 | 1/2012 | Pyzik et al. |
| 8,118,079 B2 | 2/2012 | Hanna et al. |
| 8,132,612 B2 | 3/2012 | Morais et al. |
| 8,399,107 B2 | 3/2013 | Pyzik et al. |
| 8,408,369 B2 * | 4/2013 | Woychowski ...... F16D 65/12 188/218 XL |
| 8,455,379 B2 | 6/2013 | McCullough et al. |
| 8,550,145 B2 | 10/2013 | Wood et al. |
| 8,684,149 B2 | 4/2014 | Mueller |
| 8,733,517 B2 | 5/2014 | Tironi et al. |
| 8,739,946 B2 | 6/2014 | Pahle et al. |
| 8,820,491 B2 | 9/2014 | Hanna |
| 8,865,607 B2 | 10/2014 | Reilly et al. |
| 8,905,203 B2 | 12/2014 | Lee et al. |
| 8,945,466 B2 | 2/2015 | Ishido et al. |
| 9,038,271 B2 | 5/2015 | Huang et al. |
| 9,079,241 B2 | 7/2015 | Barber et al. |
| 9,127,734 B2 | 9/2015 | Hanna et al. |
| 9,174,274 B2 | 11/2015 | Hanna et al. |
| 9,249,848 B2 | 2/2016 | Kokott |
| 9,527,132 B2 | 12/2016 | Lowe et al. |
| 9,776,241 B2 * | 10/2017 | Huang ............ B22D 19/0081 |
| 2004/0084260 A1 | 5/2004 | Hoyte |
| 2004/0084261 A1 | 5/2004 | Burgoon et al. |
| 2004/0151935 A1 | 8/2004 | Dzugan et al. |
| 2004/0178031 A1 | 9/2004 | Gotti et al. |
| 2004/0202883 A1 | 10/2004 | Scheydecker et al. |
| 2005/0183909 A1 * | 8/2005 | Rau, III ............ F16D 65/0006 188/218 XL |
| 2005/0189083 A1 | 9/2005 | Stahl, Jr. et al. |
| 2006/0016646 A1 * | 1/2006 | Banks ............ F16D 65/122 188/218 XL |
| 2007/0009754 A1 | 1/2007 | Dzugan et al. |
| 2007/0170016 A1 | 7/2007 | Yamamoto et al. |
| 2007/0181390 A1 | 8/2007 | Korm |
| 2007/0235270 A1 | 10/2007 | Miskinis et al. |
| 2008/0135359 A1 | 6/2008 | Basirico et al. |
| 2008/0230940 A1 | 9/2008 | Meier et al. |
| 2009/0011211 A1 | 1/2009 | Weinstein et al. |
| 2009/0020383 A1 | 1/2009 | Hanna et al. |
| 2009/0075056 A1 | 3/2009 | Iwamoto et al. |
| 2010/0331166 A1 | 12/2010 | Hidaka et al. |
| 2011/0003164 A1 | 1/2011 | Menge et al. |
| 2011/0290602 A1 | 12/2011 | Kleber et al. |
| 2012/0111674 A1 * | 5/2012 | Moore ............ F16D 65/12 188/218 XL |
| 2012/0186919 A1 | 7/2012 | Hanna et al. |
| 2013/0081776 A1 | 4/2013 | Hanna et al. |
| 2014/0158486 A1 | 6/2014 | Schorn et al. |
| 2014/0199205 A1 | 7/2014 | Kim et al. |
| 2014/0360633 A1 | 12/2014 | Sato et al. |
| 2015/0136546 A1 | 5/2015 | Kim et al. |
| 2015/0184712 A1 | 7/2015 | Kim et al. |
| 2015/0252451 A1 | 9/2015 | Al-Aqeeli et al. |
| 2015/0267766 A1 | 9/2015 | Barber et al. |
| 2015/0285322 A1 | 10/2015 | Wallmeier |
| 2016/0023951 A1 | 1/2016 | Alessi et al. |
| 2016/0068934 A1 | 3/2016 | Wood |
| 2016/0158830 A1 | 6/2016 | Morals et al. |
| 2016/0273080 A1 | 9/2016 | Tarrant et al. |
| 2016/0273081 A1 | 9/2016 | Tarrant et al. |
| 2016/0303650 A1 | 10/2016 | Tarrant et al. |
| 2017/0074335 A1 | 3/2017 | Wagner |
| 2017/0074336 A1 | 3/2017 | Burgoon |
| 2017/0074337 A1 | 3/2017 | Bomer et al. |

OTHER PUBLICATIONS

Joshi, Parth S. et al., "Manufacturing of Disc Brake Rotor Using Aluminium Metal Matrix Composite (AMMC) reinforced with Silicon Carbide", Imperial Journal of Interdisciplinary Research, 2016, pp. 1195-1200, vol. 6.

Prasad, S.V., "Aluminum metal-matrix composites for automotive applications: tribological considerations", Tribology Letters, Oct. 2004, pp. 445-453, vol. 17, No. 3.

Zuhailawati, H., "Fabrication of Low Cost of Aluminium Matrix Composite Reinforced with Silica Sand", Journal of Physical Science, 2007, pp. 47-55, vol. 18(1).

Edrisy et al. "Wear of thermal spray deposited low carbon steel coatings on aluminum alloys" Wear, 2001, vol. 251, pp. 1023-1033.

"Thems Da Brakes . . . " Deanz Rodz & Race Carz, pp. 1-2, http://www.deanzrodzandracecarz.com/karma-ghia_blue_mamba/karma-ghia_pg2 (Accessed Mar. 23, 2017).

* cited by examiner

HIGH PERFORMANCE DISC BRAKE ROTOR

BACKGROUND

A typical disc brake rotor includes a core consisting of a hat-shaped section having a central mounting face for mounting the rotor on an associated drive member, such as a spindle or vehicle axle. The hat-shaped section also includes a generally cylindrical shoulder or hat wall extending from the periphery of the mounting face. A pair of annular friction rings or brake plates, including an inboard friction ring and outboard friction ring, can be secured to annular mounting surfaces of the core. Disc brake rotors are subjected to high mechanical and thermal stresses in practical applications, and heating of the annular friction rings may lead to stress cracks.

BRIEF DESCRIPTION

According to one aspect, a disc brake rotor comprises a core including a hat-shaped section, an annular inboard mounting surface, and an annular outboard mounting surface axially spaced from the inboard mounting surface and connected to the inboard mounting surface. The hat-shaped section has a central mounting face for mounting the rotor on an associated drive member and a generally cylindrical shoulder extending from a periphery of the mounting face. An inboard friction ring includes radially extending first projections. The first projections are angularly spaced from one another relative to a rotational axis of the rotor, and are secured to the inboard mounting surface. An outboard friction ring includes radially extending second projections. The second projections are angularly spaced from one another relative to the rotational axis, and are secured to the outboard mounting surface. The first projections are angularly aligned with the second projections. The first and second projections extend into the space between the inboard and outboard mounting surfaces and have a gap therebetween.

According to another aspect, a disc brake rotor comprises a core formed of an aluminum alloy. The core includes a hat-shaped section, an annular inboard mounting surface, and an annular outboard mounting surface axially spaced from the inboard mounting surface. The hat-shaped section has a central mounting face for mounting the rotor on an associated drive member and a generally cylindrical shoulder extending from a periphery of the mounting face. The annular inboard mounting surface includes radially extending first slots. The annular outboard mounting surface includes radially extending second slots. The core further includes radially extending fins located in the space defined by the inboard and outboard mounting surfaces. The fins are angularly spaced from one another relative to a rotational axis of the rotor and directly interconnect the inboard and outboard mounting surface. An inboard friction ring formed of an aluminum ceramic composite includes radially extending first projections. The first projections are received in the first slots and form a mechanical interlock with the inboard mounting surface. An outboard friction ring formed of an aluminum ceramic composite includes radially extending second projections. The second projections are received in the second slots and form a mechanical interlock with the outboard mounting surface. Each of the first and second projections extend into the space between the inboard and outboard mounting surfaces.

According to another aspect, a disc brake rotor comprises a core formed of an aluminum alloy. The core includes a hat-shaped section, an annular inboard mounting surface, and an annular outboard mounting surface axially spaced from the inboard mounting surface. The hat-shaped section has a central mounting face for mounting the rotor on an associated drive member and a generally cylindrical shoulder extending from a periphery of the mounting face. The annular inboard mounting surface includes radially extending first slots. The annular outboard mounting surface includes radially extending second slots. The outboard mounting surfaced is connected to the inboard mounting surface via radially extending fins located in a space defined by the inboard and outboard mounting surfaces. One of the inboard mounting surface and the outboard mounting surface has an interior peripheral edge radially spaced from the shoulder of the hat-shaped section, and the other of the inboard mounting surface and the outboard mounting surface has an interior peripheral edge engaged to the shoulder. An inboard friction ring includes radially extending first projections. The first projections are angularly spaced from one another relative to a rotational axis of the rotor. The first projections are received in the first slots and form a mechanical interlock with the inboard mounting surface. An outboard friction ring includes radially extending second projections. The second projections are angularly spaced from one another relative to the rotational axis. The second projections are received in the second slots and form a mechanical interlock with the outboard mounting surface. The first projections are angularly aligned with the second projections. The first and second projections extend into the space between the inboard and outboard mounting surfaces and have a gap therebetween.

DETAILED DESCRIPTION

Figure 1:
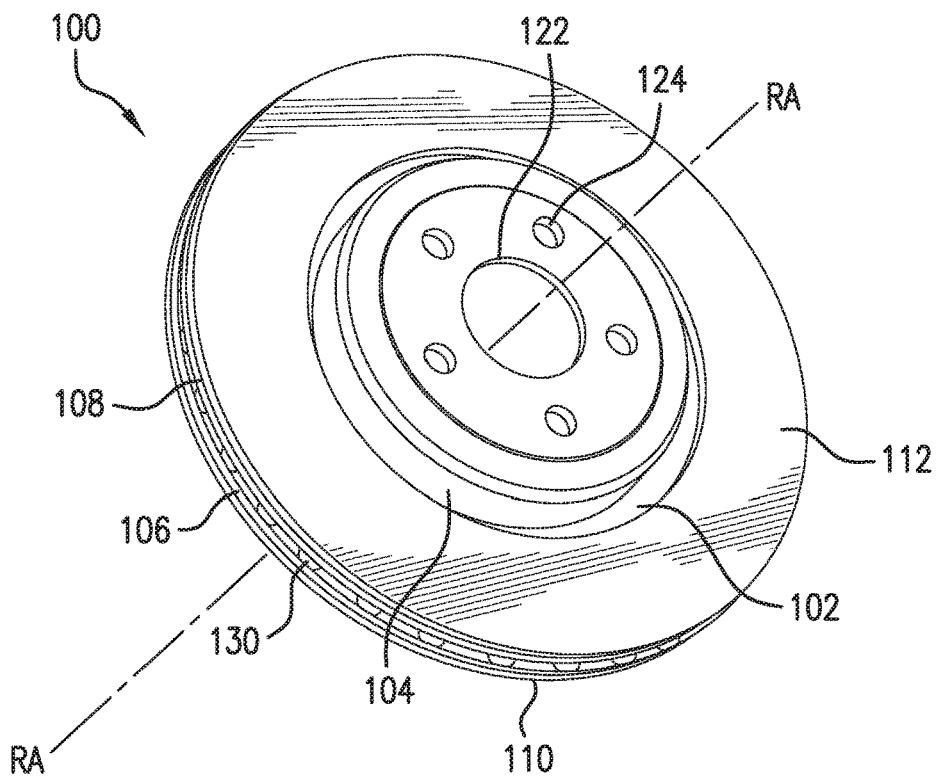
FIG. 1 is an outboard perspective view of an exemplary disc brake rotor according to the present disclosure.
Figure 2:
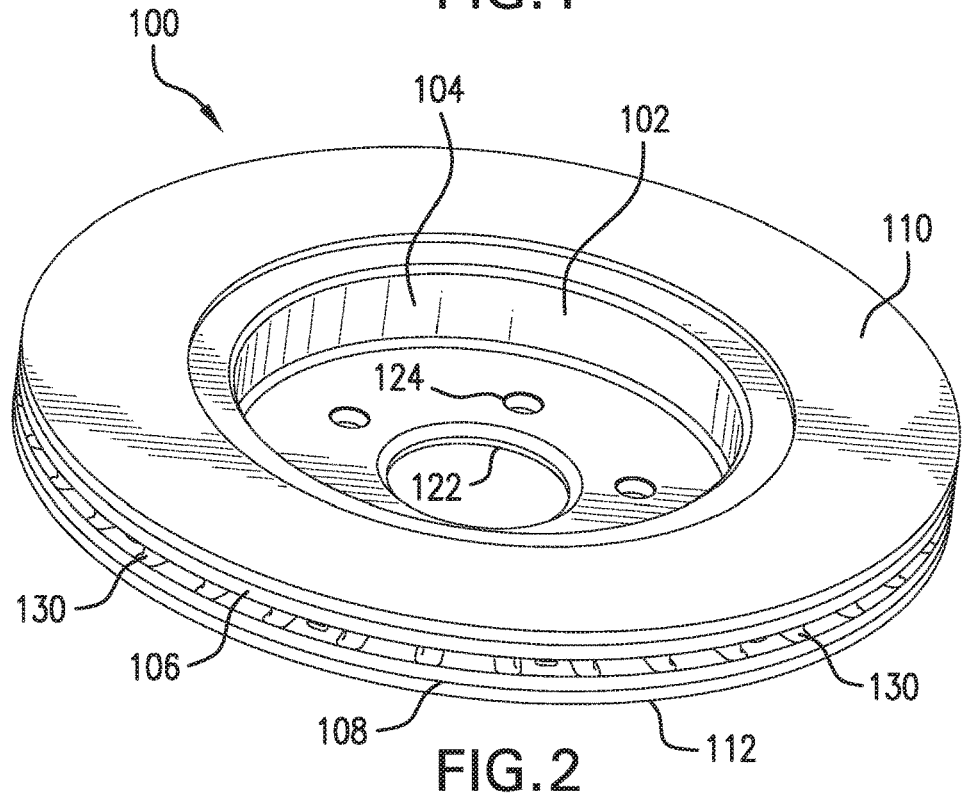
FIG. 2 is an inboard perspective view of the disc brake rotor.
Figure 3:
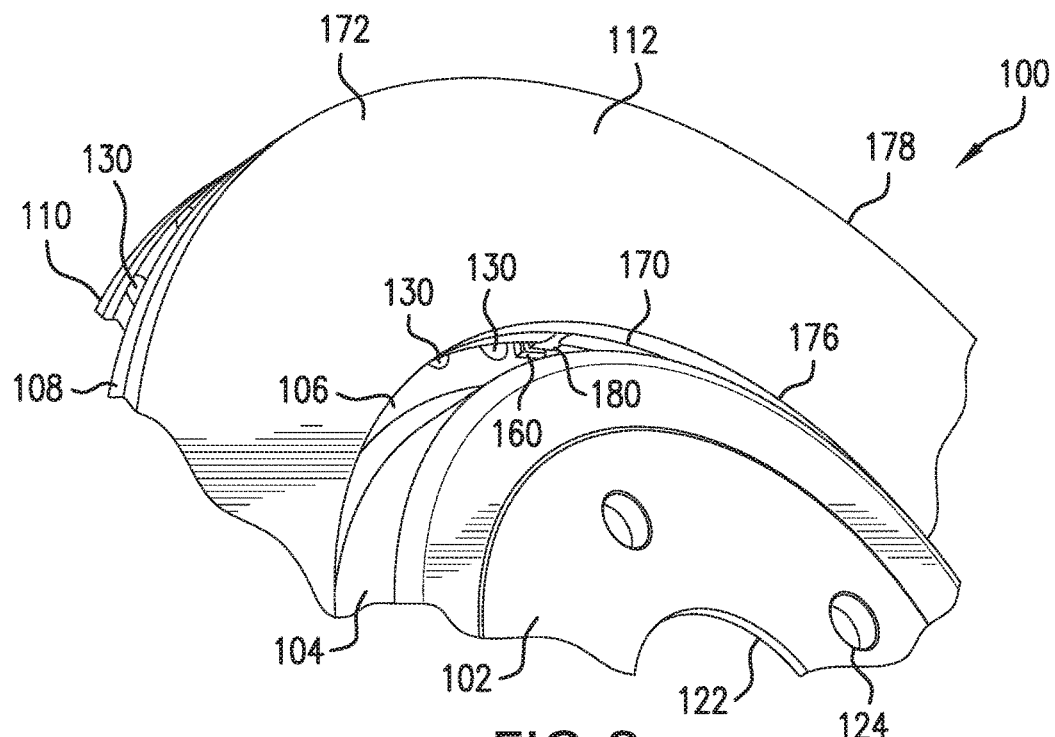
FIG. 3 is a partial enlarged view of FIG. 1.

It should, of course, be understood that the description and drawings herein are merely illustrative and that various modifications and changes can be made in the structures disclosed without departing from the present disclosure. FIGS. 1-3 depict a disc brake rotor embodying the present disclosure and designated generally with the reference numeral 100. The rotor 100 is of the type adapted for use in conjunction with a variety of mechanical devices, especially disc brake braking systems for a vehicle. The exemplary rotor 100 comprises a core 102 including a hat-shaped section 104, an annular inboard mounting plate or surface 106, and an annular outboard mounting plate or surface 108 axially spaced from the inboard mounting surface relative to a rotational axis RA of the rotor. The outboard mounting surface 108 is connected to the inboard mounting surface 106. An inboard friction ring 110 is secured to the inboard mounting surface 106, and an outboard friction ring 112 is secured to the outboard mounting surface 108.

Figure 4:
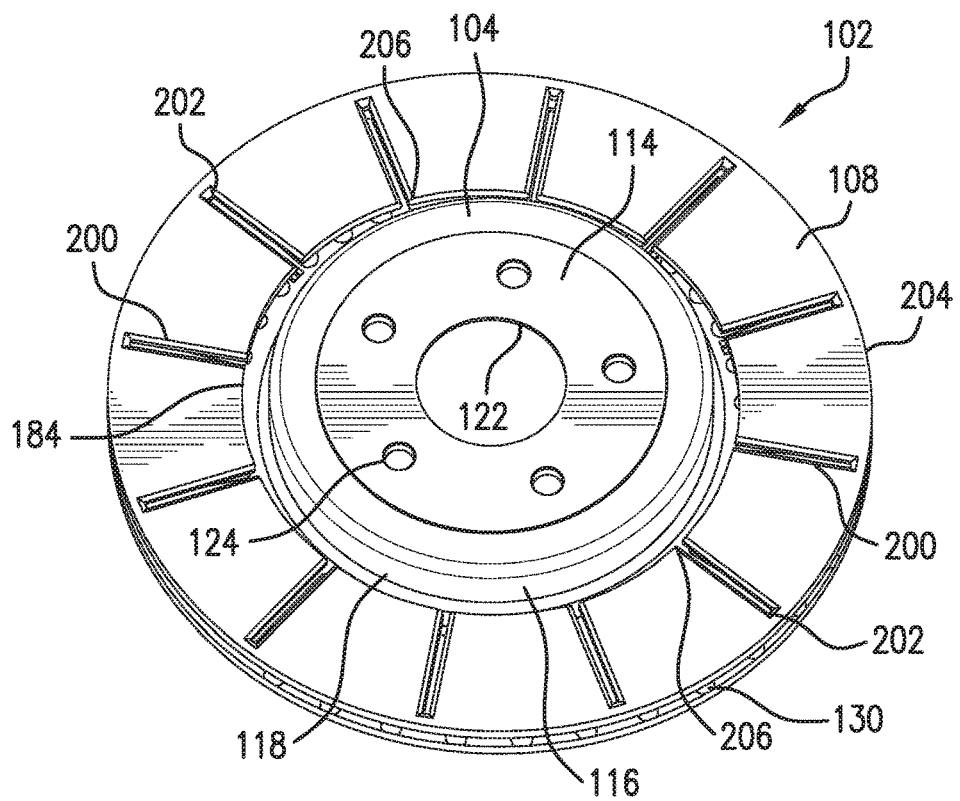
FIG. 4 is an outboard perspective view of an exemplary core of the disc brake rotor.
Figure 5:
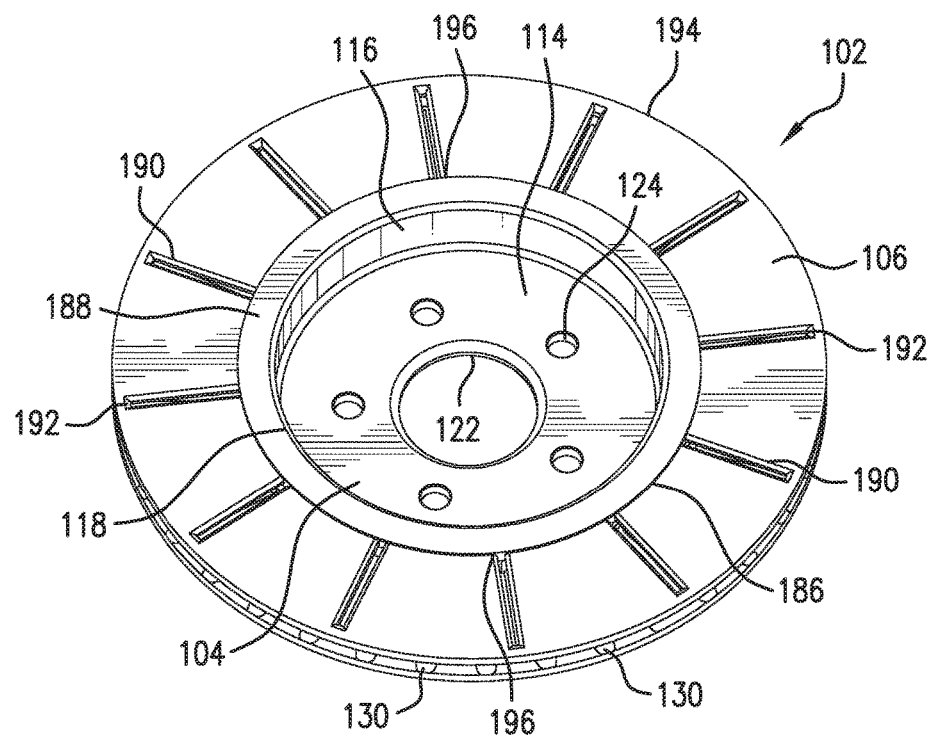
FIG. 5 is an inboard perspective view of the core.
Figure 6:
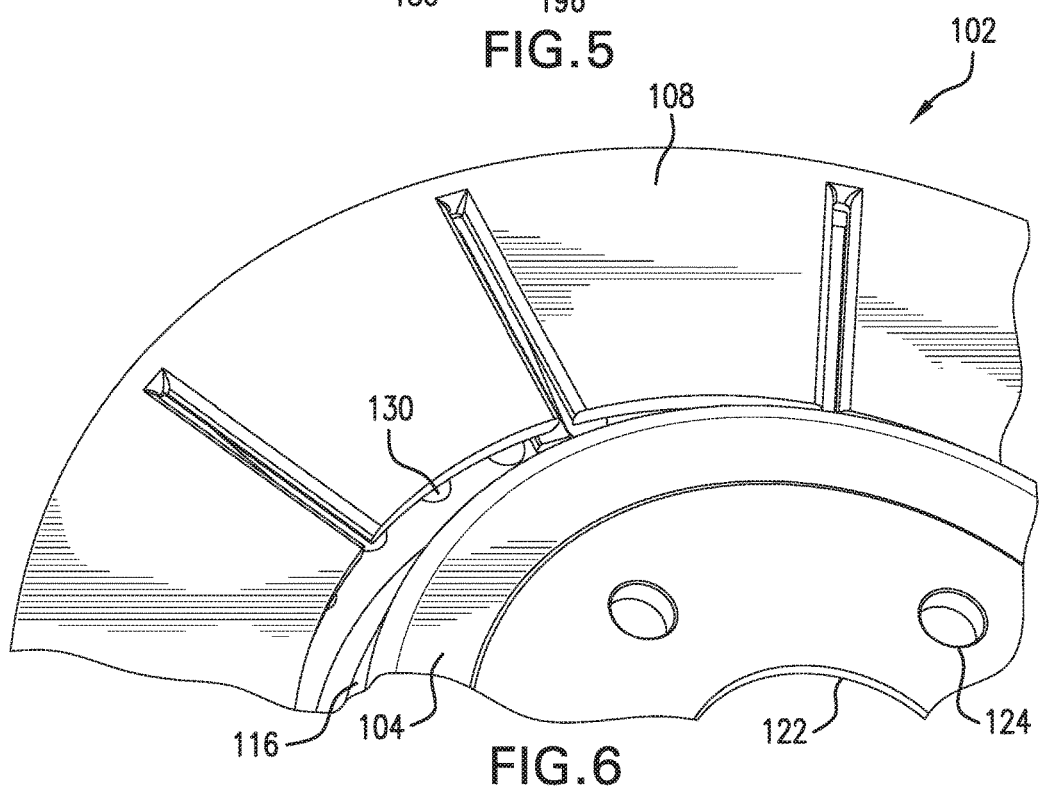
FIG. 6 is a partial enlarged view of FIG. 4.

The core 102 is best shown in FIGS. 4-6. The hat-shaped section 104 has a central mounting face 114 for mounting the rotor 100 on an associated drive member (not shown), such as a spindle or vehicle axle. The hat-shaped section 104 also includes a generally cylindrical shoulder or wall 116 extending from a periphery of the mounting face 114 and terminating at an inboard edge 118. Alternatively, the shoulder 116 of the hat-shaped section 104 may be inclined relative to the mounting face 114, forming a portion of a truncated cone. The central mounting face 114 of the hat-shaped section 104 is provided with a central pilot aperture 122 in which a spindle hub or the like (not shown) may be closely received, and a plurality of circumferentially spaced apart fastener apertures 124 in which fasteners (also not shown) may be received to mount the rotor 100 on an associated drive mechanism in the conventional manner.

Figure 7:
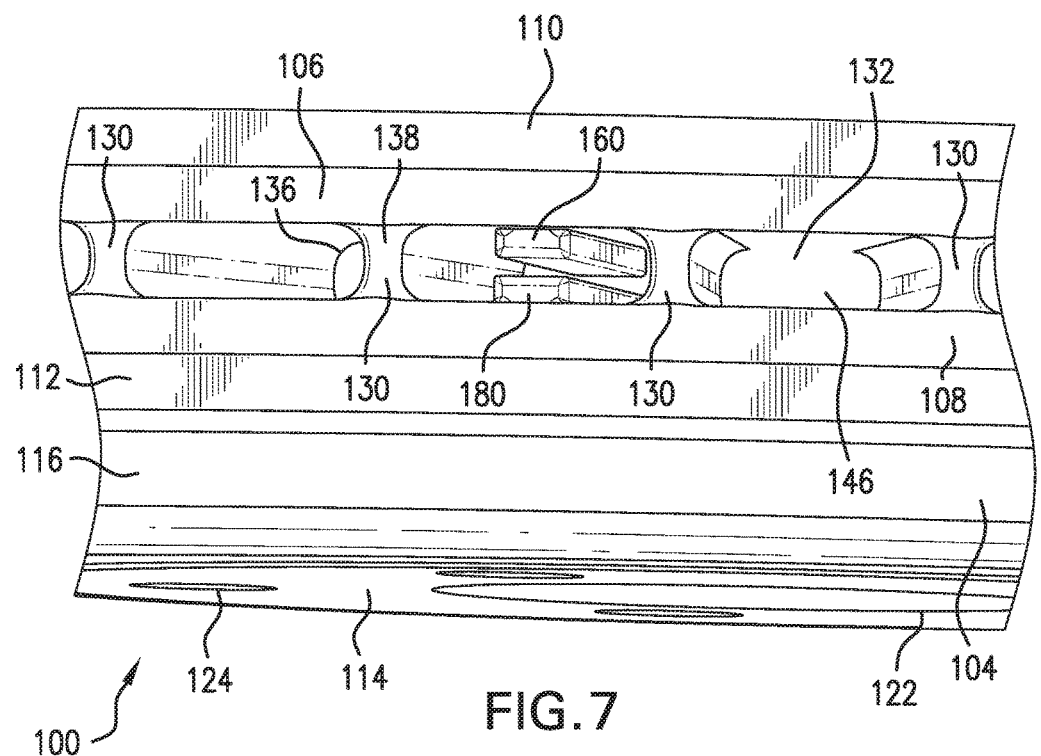
FIG. 7 is an enlarged partial side perspective view of the disc brake rotor.
Figure 8:
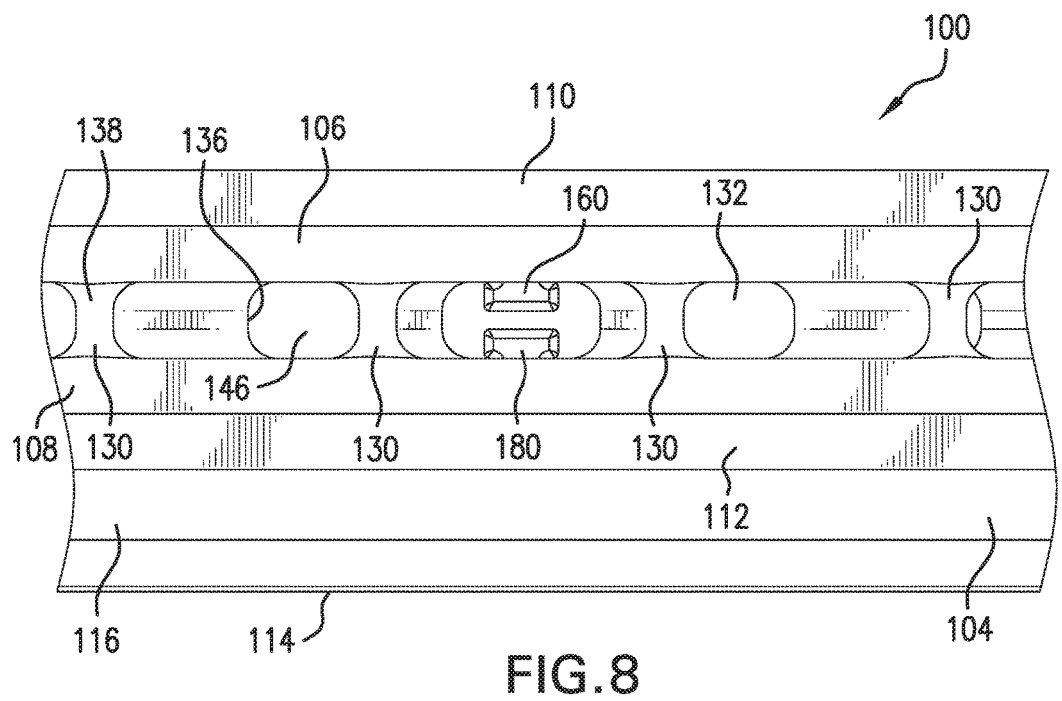
FIG. 8 is an enlarged partial side elevational view of the disc brake rotor.

As best depicted in FIGS. 7 and 8, integral with the exemplary core 102 is a plurality of individual, radially extending fins 130 located in the space 132 defined by the inboard and outboard mounting surfaces 106, 108, the fins 130 maintaining a predetermined spacing between the inboard and outboard mounting surfaces 106, 108. The fins 130 are angularly spaced from one another (relative to the rotational axis RA) and directly interconnect the inboard and outboard mounting surfaces 106, 108. Each of the fins 130 can extend a majority of a width of each of the inboard and outboard mounting surfaces 106, 108. In the depicted embodiment, each fin 130 includes a radially inner end 136 spaced from the shoulder 116 of the hat-shaped section 104 and preferably extends straight, radially outwards from the shoulder 116, terminating in a radially outer end 138 located approximate an outer periphery of the core 102. Each fin 130 can also be substantially hourglass shaped in cross-section; however, alternative shapes, for example a rectangular shape, are contemplated. As shown, between immediately adjacent fins 130 and the inboard and outboard mounting surfaces 106, 108 there is formed a radial interspace or vent 146. As the rotor 100 turns, air typically flows radially outwardly through the vents 146. Each vent 146 can receive air flowing from the outboard side of the rotor 100 between the shoulder 116 and an inner peripheral edge of the outboard friction ring 112 providing cooling for the exemplary disc brake rotor 100.

Figure 9:
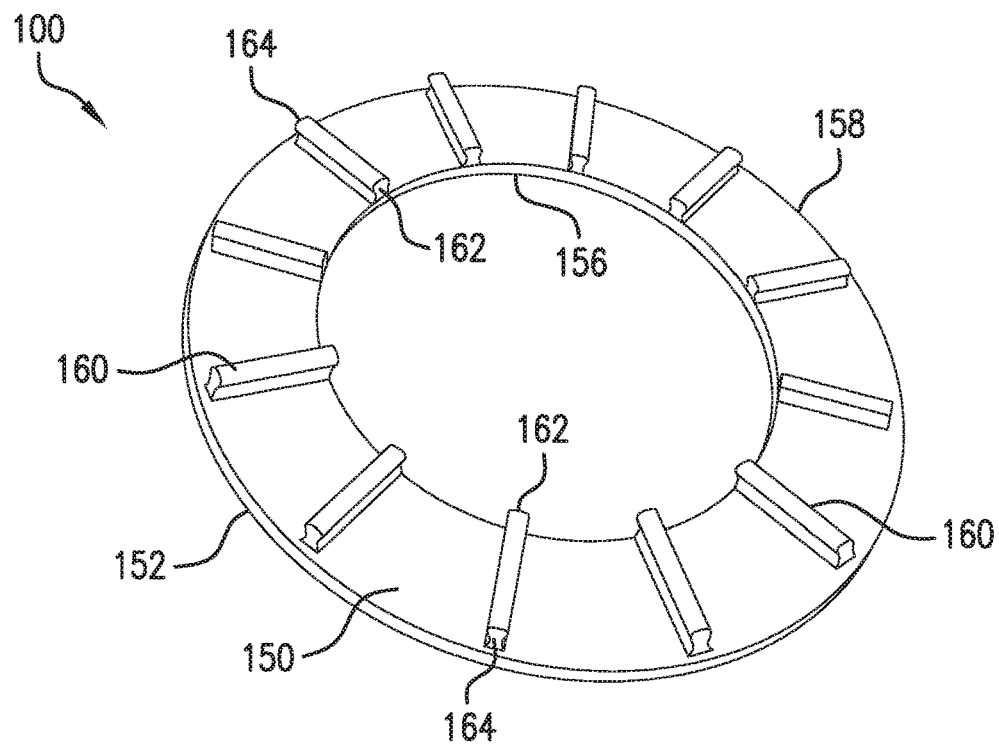
FIG. 9 is a perspective view of an exemplary friction ring of the disc brake rotor.
Figure 10:
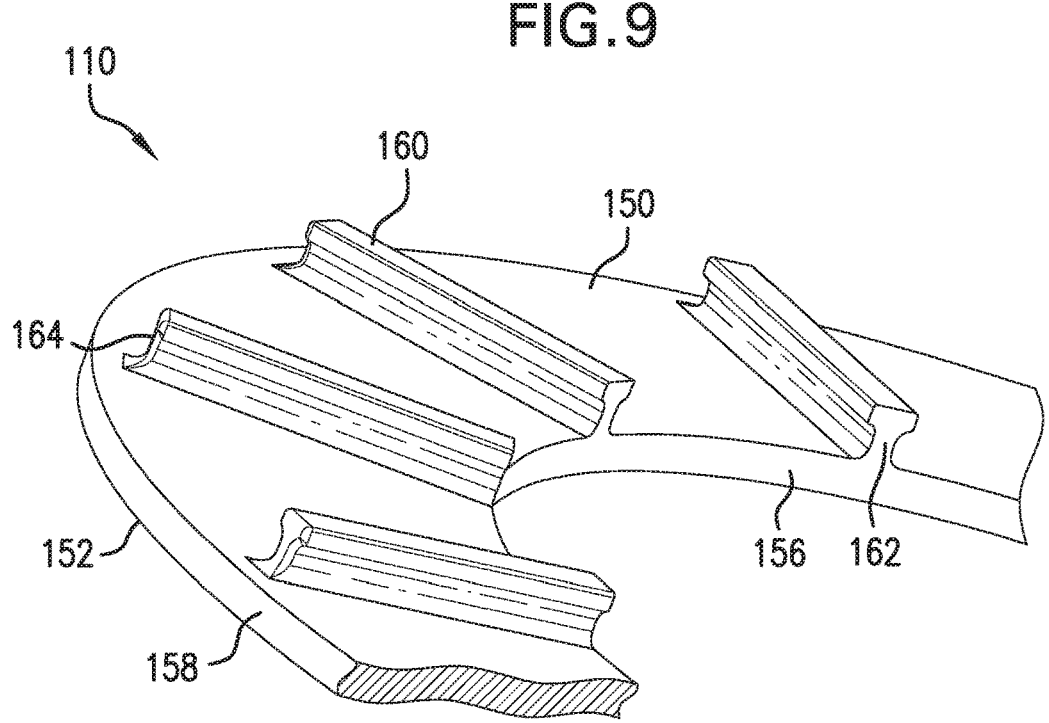
FIG. 10 is partial enlarged view of FIG. 9.

Referring now to FIGS. 9 and 10, the inboard friction ring 110 includes an inboard face 150 and an opposite outboard face 152. The inboard friction ring 110 further has a radially inner peripheral edge 156 which defines an inner diameter of the inboard friction ring 110, and a radially outer peripheral edge 158 which defines an outer diameter of the inboard friction ring 110. Provided on the inboard face 150 are radially extending first projections 160. The first projections 160 are angularly spaced from one another relative to the rotational axis RA of the rotor 100. As depicted, each first projection 160 includes a radially inner end 162 approximately flush with the inner peripheral edge 156 and preferably extends straight, radially outwards from the inner peripheral edge 156, terminating in a radially outer end 164 located approximate (e.g., spaced inwardly from) the outer peripheral edge 158. It should be appreciated that according to the present disclosure the inboard and outboard friction rings 110, 112 can be similarly constructed. Therefore, as best depicted in FIG. 3, the outboard friction ring 112 includes an inboard face 170, an opposite outboard face 172, a radially inner peripheral edge 176 which defines an inner diameter of the outboard friction ring 112, and a radially outer peripheral edge 178 which defines an outer diameter of the outboard friction ring 112. Provided on the inboard face 170 are radially extending second projections 180 which are angularly spaced from one another relative to the rotational axis RA of the rotor 100. As described in detail below, the first and second projections 160, 180 of the inboard and outboard friction rings 110, 112 secure the inboard and outboard friction rings 110, 112 to the respective inboard and outboard mounting surface 106, 108 in a mutually parallel, spaced apart relationship.

With reference back to FIGS. 4 and 5, one of the inboard mounting surface 106 and the outboard mounting surface 108 has an interior peripheral edge radially spaced from the shoulder 116 of the hat-shaped section 104, and the other of the inboard mounting surface 106 and the outboard mounting surface 108 has an interior peripheral edge engaged to the shoulder 116. According to the depicted aspect, an interior peripheral edge 184 of the outboard mounting surface 108 is radially spaced from the shoulder 116, and an interior peripheral edge 186 of the inboard mounting surface 106 is directly engaged to an annular flange 188 provided at the inboard edge 118 of the shoulder 116. The inboard mounting surface 106 includes radially extending first slots 190 for receiving the first projections 160. A closed outer first end 192 of each first slot 190 is radially spaced inwardly from an outer periphery edge 194 of the inboard mounting surface 106. An open inner second end 196 of each first slot 190 is closed by the annular flange 188 and radially spaced from the shoulder 116. In the depicted aspect, the first slots 190 are equally dimensioned and a length of each of the first projections 160 is approximately equal to (or marginally less than) a length of each first slot 190. Similarly, the outboard mounting surface 108 includes radially extending second slots 200 for receiving the second projections 180. A closed outer first end 202 of each second slot 200 is radially spaced inwardly from an outer periphery edge 204 of the outboard mounting surface 108. An open inner second end 206 of each second slot 200 is radially spaced from the shoulder 116. Again, in the depicted aspect, the second slots 200 are equally dimensioned and a length of each of the second projections 180 is approximately equal to (or marginally less than) a length of each second slot 200.

In the depicted embodiment of FIGS. 7 and 8, the first projections 160 are received in the first slots 190 and form a mechanical interlock with the inboard mounting surface 106, and the second projections 180 are received in the second slots 200 and form a mechanical interlock with the outboard mounting surface 108. To allow for this mechanical interlock, each of the first and second projections 160, 180 has an enlarged end portion, and in the exemplary embodiment, is substantially T-shaped in cross-section. However, any other undercutting shape capable of mechanically retaining the inboard and outboard friction rings 110, 112 to the respective inboard and outboard mounting surface 106, 108 is contemplated. Each of the first and second projections 160, 180 extends into the space 132 between the inboard and outboard mounting surfaces 106, 108. In a non-limiting example, the portion of each of the first and second projections 160, 180 located in the space 132 has an axial dimension less than half an axial dimension of the space. Further, in the space 132 the first projections 160 are angularly aligned with the second projections 180 and the aligned first and second projections 160, 180 have a gap therebetween. This gap allows for unrestricted expansion of the inboard and outboard friction rings 110, 112 when heated which inhibits the formation of stress cracks as a result of heating. In addition, with the fins 130 the heat transfer from the inboard and outboard friction rings 110, 112 to the core 102 and consequently to the drive member is inhibited. As shown, each of the aligned first and second projections 160, 180 is positioned between adjacent fins 130, and at least two fins 130 are positioned between adjacent aligned first and second projections 160, 180.

The core 102 is preferably an integral or one-piece unit, with the inboard and outboard mounting surfaces 106, 108 and fins 130 formed integrally with the hat-shaped section 104. The core 102 is formed of any suitable material such as, for example, cast grey iron, aluminum, magnesium, or alloys or composites including aluminum MMC and the like. In the preferred embodiment, the core 102 is formed of an aluminum alloy in a sand mold casting process. The inboard and outboard friction rings 110, 112 are preferably formed from an aluminum ceramic composite, and illustrative aluminum ceramic compositions and methods for forming aluminum ceramic compositions that may be used for the inboard and outboard friction rings 110, 112 of the present disclosure is disclosed in U.S. Pat. No. 7,267,882, the relevant disclosure of which is hereby incorporated by reference as if fully set forth herein; however, alternative known aluminum ceramic composite compositions and methods of making aluminum ceramic composites are contemplated. The inboard and outboard friction rings 110, 112 may be machined after casting to achieve their desired dimensions.

As indicated above, the exemplary disc brake rotor 100 is subjected to high mechanical and thermal stresses in practical applications, the thermal stresses increasing generally in proportion to the temperature. Because of the significantly different coefficients of thermal expansion of the aluminum alloy core 102 and the aluminum ceramic composite inboard and outboard friction rings 110, 112, the core 102 will expand at a faster rate even with a lower temperature of the brake surface. Therefore, the gap between the first and second projections 160, 180 of the inboard and outboard friction rings 110, 112 in the space 132 allows for unrestricted expansion of core 102 when heated. Further, with the lengths of the first and second projections 160, 180 approximately equal to (or marginally less than) the length of the respective first and second slot 190, 200, the core 102 can also expand around the first and second projections 160, 180 when heated. Therefore, the thermal stresses of the disc brake rotor 100 can be reduced compared to known designs when the temperature is raised or lowered.

An exemplary method for making the disc brake rotor 100 comprises the steps of first forming the two separate aluminum ceramic composite inboard and outboard friction rings 110, 112; placing a sand core between the inboard and outboard friction rings 110, 112; injecting an aluminum alloy that fills a space between the inboard and outboard friction rings 110, 112, the space defining the core 102; and shaking out the sand core. In addition step one involves forming the two separate inboard and outboard friction rings 110, 112 with the respective first and second projections 160, 180. To form the inboard and outboard friction rings 110, 112, sacrificial models may be used (e.g., wax, plastic, etc.), contacting the sacrificial model with a preform material, and allowing the preform material to harden so that it assumes the exemplary shape of the inboard and outboard friction rings 110, 112. Each of the hardened preform friction rings is then contacted with a molten aluminum ceramic composition and the reaction between the molten aluminum and the preform material is allowed to go to completion. A sand core is then placed between the formed inboard and outboard friction rings 110, 112 and an aluminum alloy is injected so that it fills the space between the inboard and outboard friction rings 110, 112 to form the core 102. The aluminum alloy of the core 102 forms the mechanical interlock with the first and second projections 160, 180 provided on the respective inboard and outboard friction rings 110, 112. The resulting product is the exemplary disc brake rotor 100 with the aluminum ceramic composite composition.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A disc brake rotor comprising:
a core including:
a hat-shaped section having a central mounting face for mounting the rotor on an associated drive member, the hat-shaped section includes a generally cylindrical shoulder extending from a periphery of the mounting face,
an annular inboard mounting plate, and
an annular outboard mounting plate axially spaced from the inboard mounting plate and connected to the inboard mounting plate;
an inboard friction ring including radially extending first projections, the first projections are angularly spaced from one another relative to a rotational axis of the rotor, the first projections are secured to the inboard mounting plate; and
an outboard friction ring including radially extending second projections, the second projections are angularly spaced from one another relative to the rotational axis, the second projections secured to the outboard mounting plate,
wherein the first projections are angularly aligned with the second projections, the first and second projections extend into a space between the inboard and outboard mounting plates and have a gap therebetween.

2. The disc brake rotor of claim 1, wherein radially extending fins integral with the core are located in the space defined by the inboard and outboard mounting plates, the fins are angularly spaced from one another relative to the rotational axis and directly interconnect the inboard and outboard mounting plates.

3. The disc brake rotor of claim 2, wherein each of the fins extend a majority of a width of each of the inboard and outboard mounting plates, each set of aligned first and second projections is positioned between adjacent fins, and at least two fins are positioned between a first set of aligned first and second projections and an adjacent second set of aligned first and second projections.

4. The disc brake rotor of claim 1, wherein the inboard mounting plate includes radially extending first slots for receiving the first projections, each of the first slots includes a closed first end radially spaced inwardly from an outer periphery edge of the inboard mounting plate.

5. The disc brake rotor of claim 4, wherein an interior periphery edge of the inboard mounting plate is engaged to the shoulder, and each of the first slots includes a closed second end radially spaced from the shoulder.

6. The disc brake rotor of claim 4, wherein the first slots are equally dimensioned and a length of each of the first projections is approximately equal to a length of each first slot.

7. The disc brake rotor of claim 1, wherein the outboard mounting plate includes radially extending second slots for receiving the second projections, each of the second slots includes a closed first end radially spaced inwardly from an outer periphery edge of the outboard mounting plate.

8. The disc brake rotor of claim 7, wherein an interior periphery edge of the outboard mounting plate is radially spaced from the shoulder, and each of the first slots includes an open second end.

9. The disc brake rotor of claim 7, wherein the second slots are equally dimensioned and a length of each of the second projections is approximately equal to a length of each second slot.

10. The disc brake rotor of claim 1, wherein each of the first and second projections is substantially T-shaped in cross-section.

11. The disc brake rotor of claim 10, wherein a first end of each first projection is spaced inwardly from an outer peripheral edge of the inboard friction ring and a second end of each first projection is approximately flush with an inner peripheral edge of the inboard friction ring, and
a first end of each second projection is spaced inwardly from an outer peripheral edge of the outboard friction ring and a second end of each second projection is approximately flush with an inner peripheral edge of the outboard friction ring.

12. A disc brake rotor comprising:
a core formed of an aluminum alloy including:
a hat-shaped section having a central mounting face for mounting the rotor on an associated drive member, the hat-shaped section includes a generally cylindrical shoulder extending from a periphery of the mounting face,
an annular inboard mounting plate including radially extending first slots,
an annular outboard mounting plate axially spaced from the inboard mounting plate and including radially extending second slots, and
radially extending fins located in a space defined by the inboard and outboard mounting plates, the fins are angularly spaced from one another relative to a rotational axis of the rotor and directly interconnect the inboard and outboard mounting plates;
an inboard friction ring formed of an aluminum ceramic composite and including radially extending first projections, the first projections are received in the first slots and form a mechanical interlock with the inboard mounting plate; and
an outboard friction ring formed of an aluminum ceramic composite and including radially extending second projections, the second projections are received in the second slots and form a mechanical interlock with the outboard mounting plate,
wherein each of the first and second projections extend into the space between the inboard and outboard mounting plates.

13. The disc brake rotor of claim 12, wherein that portion of each of the first and second projections located in the space has an axial dimension less than half an axial dimension of the space.

14. The disc brake rotor of claim 12, wherein the first projections are angularly aligned with the second projections and have a gap therebetween.

15. The disc brake rotor of claim 14, wherein at least two fins are positioned between a first set of aligned first and second projections and an adjacent second set of aligned first and second projections.

16. The disc brake rotor of claim 12, wherein one of the inboard mounting plate and the outboard mounting plate has an interior peripheral edge radially spaced from the shoulder of the hat-shaped section, and the other of the inboard mounting plate and the outboard mounting plate has an interior peripheral edge engaged to the shoulder.

17. The disc brake rotor of claim 12, wherein the first projections are angularly spaced from one another relative to the rotational axis, and the second projections are angularly spaced from one another relative to the rotational axis.

18. The disc brake rotor of claim 12, wherein each of the first and second projections is substantially T-shaped in cross-section.

19. The disc brake rotor of claim 12, wherein the first slots are angularly spaced from one another relative to the rotational axis and equally dimensioned, a length of each of the first projections is approximately equal to a length of each first slot, and
the second slots are angularly spaced from one another relative to the rotational axis and equally dimensioned, a length of each of the second projections is approximately equal to a length of each second slot.

20. A disc brake rotor comprising:
a core including:
a hat-shaped section having a central mounting face for mounting the rotor on an associated drive member, the hat-shaped section includes a generally cylindrical shoulder extending from a periphery of the mounting face,
an annular inboard mounting plate including radially extending first slots, and
an annular outboard mounting plate axially spaced from the inboard mounting plate and including radially extending second slots, the outboard mounting plate connected to the inboard mounting plate via radially extending fins located in a space defined by the inboard and outboard mounting plates,
wherein one of the inboard mounting plate and the outboard mounting plate has an interior peripheral edge radially spaced from the shoulder of the hat-shaped section, and the other of the inboard mounting plate and the outboard mounting plate has an interior peripheral edge engaged to the shoulder;
an inboard friction ring including radially extending first projections, the first projections are angularly spaced from one another relative to a rotational axis of the rotor, the first projections are received in the first slots and form a mechanical interlock with the inboard mounting plate; and
an outboard friction ring including radially extending second projections, the second projections are angularly spaced from one another relative to the rotational axis, the second projections are received in the second slots and form a mechanical interlock with the outboard mounting plate,
wherein the first projections are angularly aligned with the second projections, the first and second projections extend into the space between the inboard and outboard mounting plates and have a gap therebetween.

* * * * *